Feb. 22, 1966

HADI HASHEMI-TAFRESHI 3,236,057

REMOVAL OF CARBON DIOXIDE AND/OR HYDROGEN
SULPHIDE FROM METHANE

Filed May 28, 1962

INVENTOR.
Hadi Hashemi-Tafreshi
BY
Oome, McDougall and Hersh
Att'ys

United States Patent Office 3,236,057
Patented Feb. 22, 1966

3,236,057
REMOVAL OF CARBON DIOXIDE AND/OR
HYDROGEN SULPHIDE FROM METHANE
Hadi Hashemi-Tafreshi, Norman, Okla., assignor to Conch International Methane Limited, Nassau, Bahamas, a corporation of the Bahamas
Filed May 28, 1962, Ser. No. 198,036
2 Claims. (Cl. 62—12)

This invention relates to a process for the removal of those constituents in natural gas which solidify at low temperatures, such as carbon dioxide, hydrogen sulphide, neopentane, etc.

In the copending application Ser. No. 13,857, filed on Mar. 9, 1960, now Patent Number 3,132,016, description is made of a process for the removal of a component from a fluid stream containing at least two components in which the process comprises the steps of removing one of the components as a solid by cooling the feed stream in a temperature reduction step, separating the solids from the fluids present after the cooling step, admixing the removed solids with a carrier medium and passing said solid and carrier medium to the cooling step of the process in heat exchange relation with the fluid stream, and causing a phase change of the solid wtih a corresponding absorption of heat from the feed stream.

The heat exchange according to the process of said application Ser. No. 13,857, produced by passing the mixture of solid and carrier medium to the cooling step, can be very efficient, and the cooling step will not plug if a suitable carrier medium and a suitable velocity for the mixture of solid and carrier medium are chosen.

It has been found, however, that the efficiency of the heat exchange is reduced when the carrier medium in the mixture is subject to evaporation before the change in phase of the solid takes place. For example, if the mixture passed into the cooling step comprises a slurry of solid carbon dioxide and/or solid hydrogen sulphide in liquid methane, the liquid methane can evaporate before a change in phase occurs in the solid carbon dioxide and/or solid hydrogen sulphide thereby producing accumulation of solid carbon dioxide and/or solid hydrogen sulphide without carrier medium in the cooling step. Such occurrence would lead to blockage of said step.

It is an object of this invention to provide in a process for the removal of carbon dioxide or hydrogen sulphide from liquefied natural gas or methane in which the carbon dioxide or hydrogen sulphide is precipitated as a solid from the liquid hydrocarbon, a novel step that overcomes the said obstacle which might occur in the process of the application Ser. No. 13,857. As used herein, the term liquefied natural gas is meant to include liquefied methane, liquefied natural gas and liquefied lower hydrocarbons.

These and other objects and advantages of this invention will hereinafter appear and for purposes of illustration, but not of limitation, embodiments of the invention are shown in the accompanying drawing in which.

In accordance with the practice of this invention there is provided a process for the removal of carbon dioxide or hydrogen sulphide from natural gas in which carbon dioxide or hydrogen sulphide is precipitated as a solid from liquefied natural gas and which comprises the step of passing a slurry of solid carbon dioxide or solid hydrogen sulphide in the liquefied natural gas into a bath of a carrier liquid maintained under such conditions of pressure and temperature that the carbon dioxide or hydrogen sulphide boils off therefrom.

A suitable liquid for use in the bath as a carrier liquid should be characterized by a viscosity which is low and a vapor pressure which is low at the working temperature of the bath. The temperature of the bath should, in turn, be so controlled as to make it possible for the solid carbon dioxide or hydrogen sulphide-liquefied natural gas mixture in the bath to evaporate. For example, if the process is addressed to the separation of carbon dioxide and if the bath is maintained at atmospheric pressure, a suitable temperature would be about —100° F., and a suitable liquid for the bath could be a hydrocarbon heavier than ethane or mixtures of such hydrocarbons, for example, propane, butane or a mixture of $C_5$ hydrocarbons and $C_4$ hydrocarbons, such as pentane and butane.

The temperature of the liquid in the bath is preferably maintained at the desired level by heating the bath with a feed stream of natural gas subsequently to be treated according to this invention. The gas or gases boiled off from the bath are also preferably passed in heat exchange relationship with the feed stream of natural gas to be treated in accordance with this invention. It is especially preferred that the natural gas used to operate the heat exchanger also be used afterwards to heat the bath.

When applying this invention to a preferred method for the removal of carbon dioxide from natural gas, a stream of natural gas containing carbon dioxide is cooled while maintaining pressure such that the natural gas will be completely liquefied and all of the carbon dioxide is dissolved in the liquefied natural gas, for example, as shown in U.S. Patent No. 2,900,797. The pressure on the resultant liquid is then reduced by passing the feed stream through an expansion valve or an expansion engine, thereby further to reduce the temperature of the feed stream with corresponding precipitation of finely divided solid carbon dioxide from the liquid.

This invention can be employed also for the removal of hydrogen sulphide from natural gas, as in the system described in U.S. Patent No. 2,901,326.

This invention will be described with reference to the removal of carbon dioxide present in a concentration of 0.23 mol percent in a feed stream of liquefied natural gas at a temperature of —212° F. and 750 p.s.i.a. with about 5.44 mol percent of nitrogen also present in the feed stream.

Figure 1:
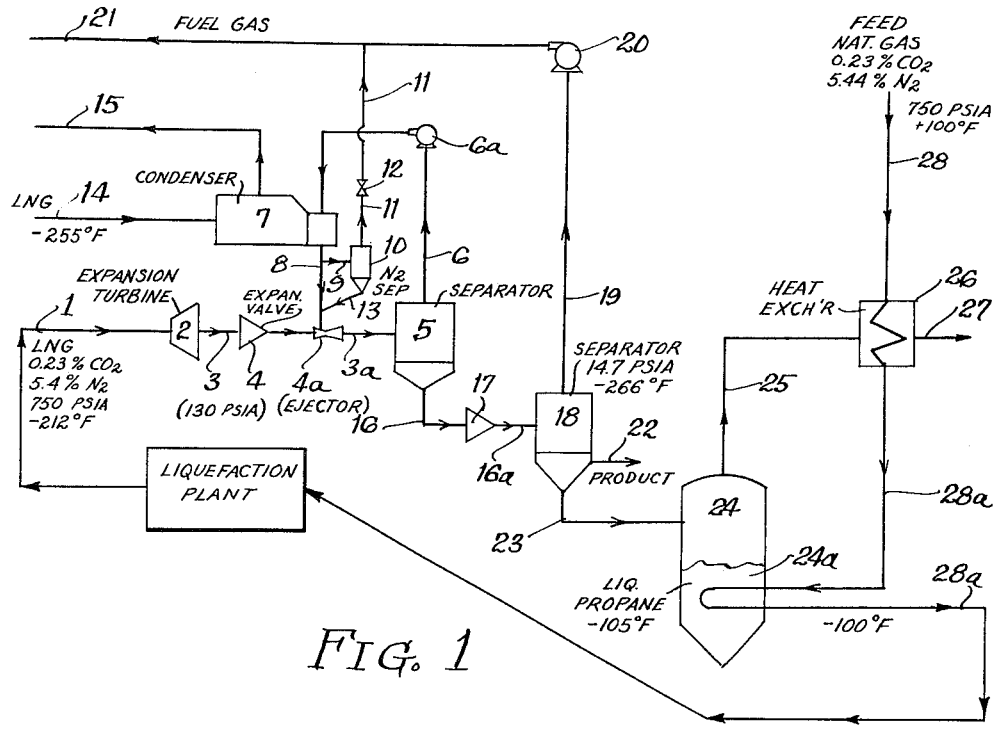
FIG. 1 is a flow diagram illustrating the practice of this invention.

With reference now to FIG. 1 of the drawings, the feed stream is advanced through conduit 1 to an expansion turbine 2 wherein the pressure of the feed stream is let down from 750 p.s.i.a. to 130 p.s.i.a. with work but without vaporization. From the expansion turbine, the feed stream at 130 p.s.i.a. is advanced through line 3 through an expansion valve 4 wherein the pressure is let down to 50 p.s.i.a. while some of the liquefied nitrogen gas is flashed off as a gas and with a corresponding drop in temperature to —245° F. at which temperature carbon dioxide solidifies to form a mixture of solid particles of carbon dioxide, liquefied natural gas, gaseous nitrogen and gaseous hydrocarbon. The mixture is advanced through an ejector 4ª and through line 3ª to a vessel 5 which operates as a separator.

The gaseous components including the gaseous natural gas and nitrogen are removed from the vessel 5 through the conduit 6 through which they are advanced by the blower 6ᵃ to the condenser 7 for passage in indirect heat exchange relation with liquefied natural gas whereby the gaseous components bled off from the vessel 5 are partially condensed and advanced through conduit 8 from the heat exchanger 7 into the low pressure side of the ejector 4ᵃ at corresponding pressure. If desired, nitrogen rich gases in conduit 8 can be bypassed through conduit 9 into a separator 10 for removal of nitrogen gas from separator 10 into the passage 11 and through the valve 12 into the conduit 21 while liquid natural gas or other hydrocarbon drains from the separator 10 into conduit 13 for return to conduit 8. The liquefied methane or liquefied natural gas which is employed as the coolant in the partial condenser 7 is fed in the condenser through line 14 at a temperature of $-255°$ F. and it departs from the condenser through line 15. Liquefied natural gas or liquefied hydrocarbon can be made available for this purpose from the main liquefaction plant.

The slurry of solid particles of carbon dioxide and liquefied natural gas are removed from the vessel 5 through the conduit 16 for passage through an expansion valve 17 whereby the pressure is reduced to atmospheric pressure of about 14.7 p.s.i.a. with a corresponding flashing of some of the liquefied gas and further reduction in temperature to $-266°$ F. whereby additional amounts of carbon dioxide are precipitated. The mixture of solid particles of carbon dioxide, natural gas in a gaseous state and natural gas in a liquefied state are advanced through conduit 16ᵃ to the vessel 18 which functions as a separator. The gaseous hydrocarbons are removed from the vessel 18 via conduit 19 and the gases are displaced by the blower 20 for joinder with the nitrogen rich gas in conduit 21 to provide a gaseous mixture which can be burned as a fuel after first recovering the cold contained in the gas by passage of the gas in heat exchange relationship with the feed stream (not shown). In the vessel 18, the liquid hydrocarbon is thrown off as a product via conduit 22 while a slurry containing a higher concentration of carbon dioxide in liquefied hydrocarbon is removed via conduit 23 for passage to an evaporator 24. The evaporator is partially filled with a bath of propane liquid 24ᵃ maintained at a temperature of $-105°$ F. At the temperature of $-105°$ F., the solid carbon dioxide undergoes a phase change from a solid to a gas while the liquefied natural gas is also converted by phase change from a liquid phase to a gaseous phase, both of which are accompanied with the absorption of heat.

The gaseous carbon dioxide and natural gas in a gaseous phase pass from the evaporator 24 into conduit 25 to a heat exchanger 26 having an outlet conduit 27. In the heat exchanger 26 the gaseous materials are passed in heat exchange relation with natural gas advanced through the heat exchanger from the line 28 to the conduit 28ᵃ which leads through the evaporator 24 for passage of the natural gas in heat exchange relation with the carbon dioxide and liquefied gas during phase change, as previously pointed out.

Heat is absorbed from the natural gas in the evaporator 24 and heat exchanger 26 in the following manner: Gaseous natural gas containing 0.23 mol percent of carbon dioxide and 5.44 mol percent of nitrogen enters the system via conduit 28 under a pressure of 750 p.s.i.a. and at a temperature of 100° F. The natural gas passes through heat exchanger 26 wherein it gives up heat by indirect heat exchange to the gaseous carbon dioxide and gaseous hydrocarbons passing therethrough from conduit 25. It subsequently passes through the evaporator 24 wherein it gives up heat by indirect heat exchange to the slurry of solid carbon dioxide in liquid hydrocarbon via the propane bath 24ᵃ and the natural gas is then directed to a liquefaction plant 28ᵇ at a temperature of $-100°$ F. at which it issues from the evaporator 24 and it is subsequently liquefied to provide the feed stream flow into conduit 1.

Figure 2:
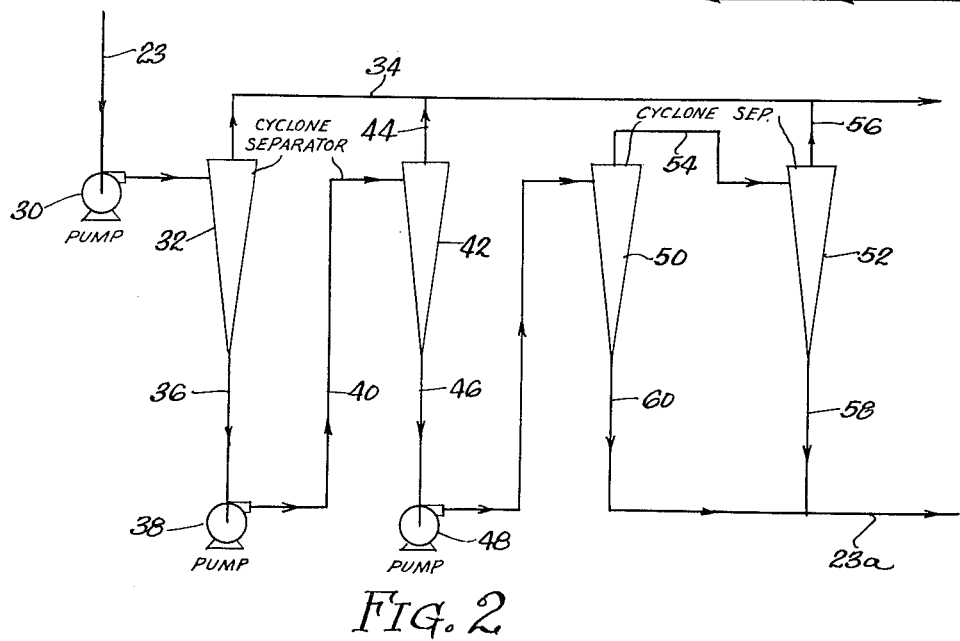
FIG. 2 is a flow diagram adapted to be inserted into the process of FIG. 1 for modification thereof.

FIG. 2 illustrates a preferred practice of this invention by way of modification of the process illustrated in FIG. 1 from the point where the slurry of solid carbon dioxide in liquefied natural gas issues as a concentrate from the base of the vessel 18 into conduit 23.

In accordance with the modification illustrated in FIG. 2, the slurry of liquefied natural gas and solid carbon dioxide particles is processed through the pump 30 for passage into a first cyclone separator 32 wherein a major separation is effected between the liquefied natural gas and solid carbon dioxide whereby liquefied natural gas free from solid carbon dioxide is removed from the outflow into conduit 34 while a thickened slurry of liquefied natural gas containing solid carbon dioxide in much higher concentration is removed at the underflow of the cyclone into the conduit 36.

The thickened underflow from the first cyclone is displaced by the pump 38 through conduit 40 to a second cyclone separator 42 where further separation is effected to remove liquefied natural gas through the conduit 44 for joinder with the product from the cyclone separator 32 in conduit 34 while the still further thickened slurry is removed from the underflow through conduit 46 for displacement by pump 48 into cyclone separators 50 and 52. In cyclone 50, the thickened slurry is separated into an underflow containing a still higher concentration of solid carbon dioxide in liquefied natural gas while the liquid component is cycled through line 54 to the cyclone separator 52 where further separation takes place to provide a liquefied natural gas component which passes out of the cyclone 52 through line 56 into line 34 for joinder with the liquefied natural gas product from separators 32 and 42. The slurry from the underflow of separator 52 and the underflow from separator 50 is advanced through lines 58 and 60 respectively into a line 23ᵃ which leads to the evaporator 24 for further processing in accordance with the process described with reference to FIG. 1. The slurry fed through line 23ᵃ to the evaporator 24 from the cyclones 50 and 52 will contain about 40 percent by volume solid carbon diooxide with the remainder liquefied hydrocarbon.

It will be understood that numerous changes may be made in the details of conditions and steps as well as materials without departing from the spirit of the invention, especially as defined in the following claims.

I claim:
1. In a process for the removal of components in natural gas which are solidifiable in liquefied natural gas when reduced to low temperature, the steps of
 (a) liquefying the natural gas under such conditions of temperature and pressure that the said components are dissolved in the liquefied natural gas,
 (b) reducing the temperature of said liquefied natural gas with corresponding precipitation of said components to form a slurry of the solidified components in liquefied natural gas,
 (c) separating said slurry from the major portion of said liquefied natural gas and withdrawing said major portion as product free of said components,
 (d) passing said slurry into a bath of liquid having a higher boiling point than natural gas which remains in a liquefied state at temperature and pressure conditions at which the solidified component in the natural gas undergoes a phase change from the solid state to a gaseous state, and separating the gaseous component.

2. The invention according to claim 1 in which said component comprises a compound selected from the group consisting of carbon dioxide, hydrogen sulphide and neopentane.

(References on following page)

References Cited by the Examiner

UNITED STATES PATENTS

| | | | |
|---|---|---|---|
| 660,755 | 10/1900 | Krausler | 62—52 |
| 1,894,497 | 1/1933 | Rowland | 62—52 |
| 2,070,098 | 2/1937 | Twomey | 62—15 |
| 2,522,026 | 9/1950 | Evans | 62—52 |
| 2,815,091 | 12/1957 | Mas | 55—85 XR |
| 2,900,797 | 8/1959 | Kurata | 62—12 |
| 2,901,326 | 8/1959 | Kurata | 62—12 XR |
| 2,928,885 | 3/1960 | Newsine | 62—15 |
| 2,960,839 | 11/1960 | Hoag | 62—52 |
| 2,996,891 | 8/1961 | Tung | 62—15 |
| 3,132,016 | 5/1964 | Kurata | 62—15 |

FOREIGN PATENTS 564,428  11/1932  Germany.

ROBERT F. BURNETT, *Primary Examiner.*

NORMAN YUDKOFF, EDWARD MICHAEL,
*Examiners.*